3,663,548
1,4-DISUBSTITUTED 2-PHENYL PIPERAZINES
Yoshihiro Nitta, Yoshiaki Ikeda, and Toshiyuki Furue, Tokyo, Akitoshi Shioya, Saitama-ken, and Shigeru Sugano and Yasuyuki Shiraki, Tokyo, Japan, assignors to Chugai Seiyaku Kabushiki Kaisha, Tokyo, Japan
No Drawing. Filed June 26, 1968, Ser. No. 740,071
Claims priority, application Japan, June 29, 1967, 42/41,303; July 28, 1967, 42/48,183
Int. Cl. C07d 51/72
U.S. Cl. 260—268 R
4 Claims

ABSTRACT OF THE DISCLOSURE

Novel 1,4-disubstituted 2-phenyl piperazines having a powerful coronary dilating action are produced. These compounds include 1-(p-chlorobenzyl)-2-phenyl-3,4-dimethyl piperazine; 1-(p-chlorobenzyl)-2-phenyl-4-methyl piperazine; and 1-(p-chlorobenzyl)-2-phenyl-4-ethyl piperazine.

---

This invention relates to novel piperazine derivatives of the formula:

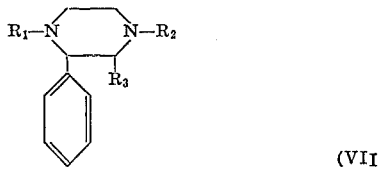

(VII)

wherein:

$R_1$ represents a lower alkyl radical containing less than 5 carbon atoms; a phenyl radical which may contain as a substituent one or two halogen atoms, a lower alkyl or a lower alkoxy both of the latter containing less than 5 carbon atoms; or a phenylalkyl radical in which alkyl contains less than 5 carbon atoms and which may contain as ring substituents one or two halogen atoms, a lower alkyl or a lower alkoxy, both the latter containing less than 5 carbon atoms;

$R_2$ represents a lower alkyl radical containing less than 5 carbon atoms or a phenylalkyl radical in which the alkyl contains less than 3 carbon atoms.; and $R_3$ represents hydrogen or a lower alkyl radical containing less than 5 carbon atoms.

The invention also relates to processes for preparing the above compounds.

The compounds of the invention are novel and have a powerful coronary dilating action, the compounds, therefore, are useful as a medicine. The compounds show 3–6 time the efficacy of aminophylline and the toxicity is so low that no side effects are observed. Sedative effect is also observable in the compounds.

The compounds of the invention are prepared, for example, by the processes as follows:

METHOD A

The compound of the formula:

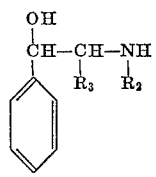

(I)

wherein $R_2$ and $R_3$ represent the same meanings as defined above, is reacted with ethylene oxide or ethylenehalogenohydrin to give the compound of the formula:

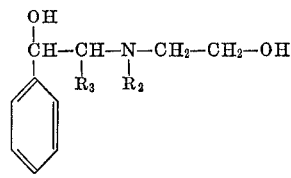

(II)

wherein $R_2$ and $R_3$ represent the same meanings as defined above, and the compound (II), thus obtained is treated with halogenating agent to give the compound of the formula:

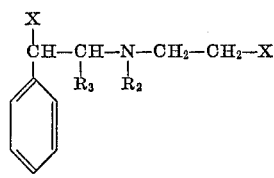

(III)

wherein $R_2$ and $R_3$ represent the same meanings as defined above and X represents a halogen, and then the compound (III) is reacted with the compound of the formula:

$$R_1—NH_2 \qquad (IV)$$

wherein $R_1$ represents the same meaning as defined above.

METHOD B

The compound (1) of the formula:

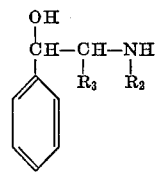

wherein $R_2$ and $R_3$ represent the same meanings as defined above, is treated with halogenating agent to give the compound of the formula:

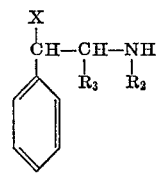

(V)

wherein $R_2$ and $R_3$ represent the same meanings as defined above and X represents a halogen, and the compound (V) thus obtained is reacted with the compound (IV) of the formula:

$$R_1—NH_2$$

wherein $R_1$ represents the same meaning as defined above, to give the compound of the formula:

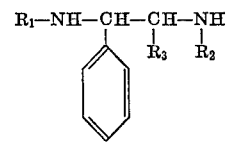

(VI)

wherein $R_1$, $R_2$ and $R_3$ represent the same meanings as defined above, and then the compound (VI) is reacted with 1,2-dihalogenoethane.

These methods are schematically shown as follows:

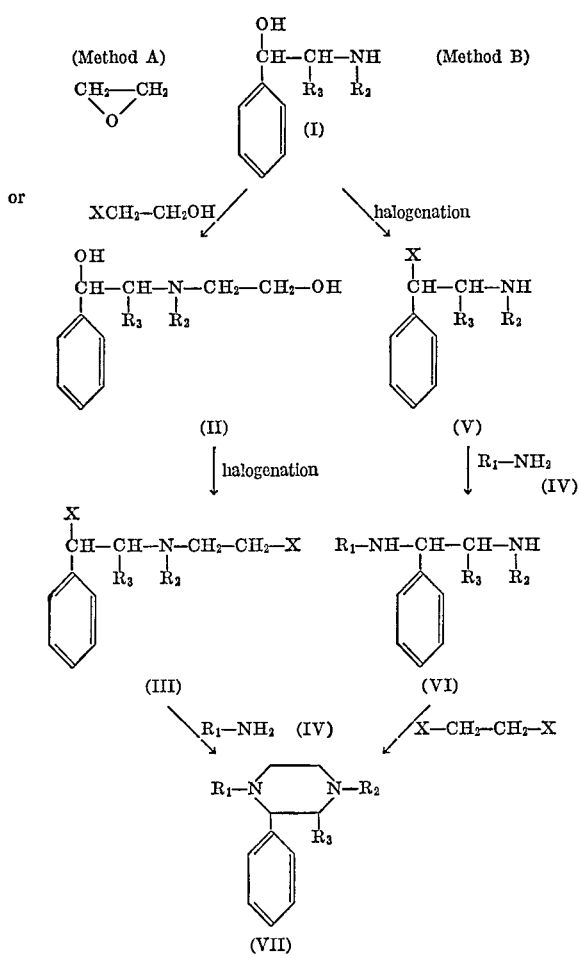

The above mentioned processes will be explained more in detail as follows:

Explaining first the method A, the first step of preparing the compound (II) from the starting material, i.e. the compound (I), is carried out by dissolving the compound (I) in such a conventional solvent as methanol, ethanol, isopropanol, benzene, toluene, xylene, dioxane, chloroform, carbon tetrachloride and the like and introducing ethylene oxide gas into the solution, or by adding dehydrohalogenating agent and ethylenehalogenohydrin to the compound (I) and reacting under heating. In the latter case, there may be mentioned as dehydrohalogenating agents inorganic alkali metal salts such as anhydrous sodium carbonate, organic tertiary amines such as triethylamine, alkali metal amides such as sodium amide. This latter reaction may be carried out in the absence of a solvent, but it is preferable to use such a solvent as methanol, ethanol, isopropanol, benzene, toluene, xylene, dioxane, chloroform, carbon tetrachloride and the like.

The second step of halogenating the compound (II) to obtain the compound (III) may be carried out by using, for example, thionyl chloride, phosphorus tribromide, hydrobromic acid, phosphorus pentachloride and the like. This second reaction may be carried out in the absence of a solvent, but it is preferable to use such a solvent as benzene, carbon tetrachloride, toluene, xylene, chloroform and the like in case of using a solid halogenating agent. Compound (III) need not necessarily be isolated from the reaction mixture and the crude product may be served directly to the next reaction preparing the aimed compound (VII) by reaction with the compound (IV), if only excess raw material and byproduced hydrogenhalide are removed from the crude product.

The third step of the reaction between the compound (III) and the compound (IV) proceeds in the absence of a solvent, but it is preferable to use such a solvent as methanol, ethanol, isopropanol, benzene, toluene, xylene, dioxane, chloroform, carbon tetrachloride and the like. The reaction may proceed without heating, but it is preferable to heat the medium for a short time to complete the reaction while it is enough to use the compound (III) and the compound (IV) in equimolar amounts, it is advantageous to use such an amount of the compound (IV) that corresponds to three times the molar amount of the compound (III) where the compound (IV) is used as a dehydrohalogenating agent, because it results in an increase of the yield. Other dehydrohalogenating agents may be advantageously added including alkali metal salts such as anhydrous sodium carbonate, organic tertiary amines such as triethylamine and alkali metal amides such as sodium amide.

In the second method B, the first step of halogenating the compound (I) is carried out by using such a halogenating agent such as thionyl chloride, phosphorous trichloride, phosphorous pentachloride, phosphorous tribromide or hydrobromic acid. The reaction may be carried out in the absence of a solvent, but it is preferable to use such a solvent such as benzene, carbon tetrachloride, toluene, xylene, chloroform and the like where a solid halogenating agent is used. The compound (V) thus obtained need not necessarily be isolated from the reaction mixture and the crude one may be served directly to the next reaction to prepare the compound (VI) by reacting with the compound (IV), if only excess raw material and by-produced hydrogenhalide are removed from the crude reactants.

The second step of preparing the compound (VI) from the compound (V) is carried out by reacting the compound (V) with primary amines designated as the compound (IV). This reaction proceeds in the absence of a solvent but it is preferable to use such a solvent as methanol, ethanol, isopropanol, benzene, toluene, xylene, dioxane, chloroform, carbon tetrachloride and the like in then presence of a dehydrohalogenating agent. It is advantageous to heat the reaction medium, because it results in the shortening of the reaction time. The reactants can be used in equimolar amounts, but it is advantageous to use an amount of the compound (IV) that corresponds to twice the molar amount of the compound (V). Other dehydrohalogenating agents may be used such as alkali metal salts such as anhydrous sodium carbonate, tertiary amines such as triethylamine or alkali metal amides such as sodium amide.

The crude product resulting from the reaction between the compound (V) and the compound (IV) may be served directly to the next reaction with a 1,2-dihalogenoethane, such as 1,2-dibromoethane, after removal of only excess dehydrohalogenating agent, unreacted reactant (IV) by-produced hydrogen halide or its salt, and the solvent, and the desired compound (VII) is obtained in a high yield. This third step reaction gives a good result if it is carried out with heating in the presence of a dehydrohalogenating agent including alkalis such as caustic soda, caustic potash, anhydrous potassium carbonate and alkali metal salts of fatty acid such as anhydrous sodium acetate or alcoholates such as sodium ethylate. While the reaction may be carried out in the absence of a solvent, a solvent such as methanol, ethanol, isopropanol, benzene, toluene, xylene, dioxane, chloroform, carbon tetrachloride and the like may be used to make the reaction medium uniform.

The raw material compound (I) may be prepared, for example, by reacting alpha-bromoalkyl phenyl ketone with primary amines to give alpha-alkyl (or alpha-phenylalkyl) amino-alkyl phenyl ketone and by reducing the compound thus obtained; the compound (I), in which $R_3$ is hydrogen, may be advantageously prepared by reacting styrene oxide with primary amines according to the following equation:

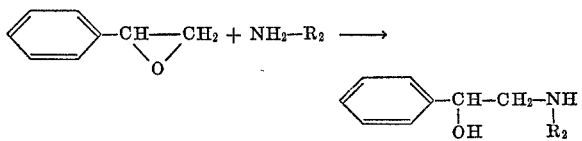

wherein $R_2$ represents the same meaning as defined above.

The novel piperazine compound (VII) may be converted into such various salts as metallic salts, e.g. hydrochloride, hydrobromide, phosphate, nitrate and sulfate; organic salts, e.g. maleate, fumarate, citrate, succinate, tartarate, methanesulfonate and ethanedisulfonate; or quaternary ammonium salts for example by using methyl iodide.

These novel piperazine derivatives have a powerful coronary dilating action and they show 3–6 times the efficacy of aminophylline and the toxicity is so low that no side effect is observed and they, therefore, are useful as a medicine.

Examples of the preparation are given below to explain the present invention in more detail. It should be understood that the present invention is not limited to the preparations described in the following examples.

EXAMPLE 1

Preparation of 1-(n-butyl)-2-phenyl-4-methylpiperazine (a) Into a solution of 48 g. of 1-phenyl-1-hydroxy-2-methylaminoethane dissolved in 37 ml. of methanol was introduced 17 g. of ethylene oxide at room temperature in the course of two and a half hours, and the mixture was heated under reflux for an hour. After the solvent was removed by distillation, the residue was distilled under reduced pressure to give 41 g. of alpha-(N-methyl-2-hydroxyethylaminomethyl)-benzylalcohol having a B.P. of 178–182° C./6 mm. Hg. Twenty grams of the product were dissolved in 100 ml. of methanol and hydrogen chloride gas was introduced into the solution under cooling with ice, and then the solvent was removed by distillation under reduced pressure to give crude alpha-(N-methyl-2-hydroxyethylaminomethyl)-benzyl-alcohol hydrochloride. The hydrochloride was suspended in chloroform and 61 g. of phosphorus pentachloride was added to the suspension over 2 hours with stirring under cooling with ice. The mixture was heated slowly and kept at 60° C. for 2 hours. Then, the reaction mixture was poured onto 200 g. of cracked ice and the mixture was made strongly alkaline with 50%-caustic soda solution. A deposited oily substance was extracted with benzene and the extract was washed with water. Removal of benzene by distillation gave 17 g. of crude 1-chloro-1-phenyl-2-(N-methyl-2-chloroethylamino)-ethane. The product was distilled under reduced pressure to give 15 g. of pure 1-chloro-1-phenyl-2-(N-methyl-2-chloroethylamino) - ethane of B.P. of 118–122° C./1 mm. Hg. To 5 g. of the product was added ethanol solution containing a calculated amount of hydrogen chloride and a formed precipitate was collected by filtration to give 5 g. of 1-chloro-1-phenyl-2-(N-methyl-2-chloroethylamino)-ethane hydrochloride. This was recrystallized from ethanol and had an M.P. of 125–127° C.

Analysis.—Calcd. for $C_{11}H_{16}NCl$ (percent): C, 49.18; H, 6.00; N, 5.21. Found (percent): C, 49.32; H, 5.99; N, 5.40.

(b) Three grams of 1-chloro-1-phenyl-2-(N-methyl-2-chloroethylamino)-ethane obtained in paragraph (a) was dissolved in 6 ml. of ethanol and 2.9 g. of n-butylamine was added slowly to the solution with stirring, and then the mixture was stirred for 6 hours. After the solvent was removed by distillation, a small volume of water was added to the residue and it was made strongly alkaline with 10%-caustic soda solution. A deposited oily substance was extracted with benzene and the extract was washed with water and benzene was removed by distillation. The residue was distilled under reduced pressure to give 2 g. of 1-(n-butyl)-2-phenyl-4-methylpiperazine having a B.P. of 124–125° C./6 mm. Hg. The product was dissolved in 5 ml. of anhydrous ethanol and an ethanol solution of a calculated amount of hydrogen chloride and ether were added to the solution, and then a formed precipitate was collected by filtration to give 1.9 g. of 1-(n-butyl)-2phenyl-4-methylpiperazine hydrochloride. Recrystallization from ethanol-ether mixture gave an M.P. of 235–237° C. (decomp.).

Analysis.—Calcd. for $C_{15}H_{26}N_2Cl_2 \cdot \frac{1}{2}H_2O$ (percent): C, 57.32; H, 8.66; N, 8.91. Found (percent): C, 57.34; H, 8.73; N, 9.14.

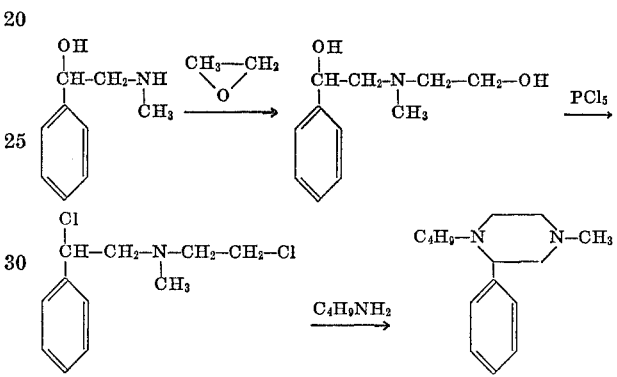

EXAMPLE 2

Preparation of 1-(n-butyl)-2-phenyl-4-methylpiperazine

To 7 g. of 1-hydroxy-1-phenyl-2-methylaminoethane hydrochloride was added 25 ml. of thionyl chloride and the mixture was heated at 50° C. for 50 minutes. Excess thionyl chloride was removed by distillation under reduced pressure to give 7.8 g. of crude 1-chloro-1-phenyl-2-methylaminoethane hydrochloride. The product was suspended into 70 ml. of ethanol and 7.5 g. of n-butylamine was dropped into the suspension with stirring in the course of 15 minutes, and then the mixture was heated under reflux for 4 hours. After the reaction, the solvent was removed by distillation and 10%-sodium carbonate solution was added to the residue. A deposited oily substance was extracted with benzene and the extract was washed with water and benzene was removed by distillation. Unreacted raw material n-butylamine was removed by distillation to give 6 g. of crude 1-(n-butylamino)-1-phenyl-2-methylaminoethane. The product was heated with 5.5 g. of 1,2-dibromoethane and 4.8 g. of anhydrous sodium acetate with stirring at 120° C. for 4 hours. After cooling, water was added to the reaction mixture and it was made strongly alkaline with 10%-caustic soda solution. A deposited oil substance was extracted with benzene and the extract was washed with water and benzene was removed by distillation. The residue was distilled under reduced pressure to give 4.4 g. of 1-(n-butyl)-2-phenyl-4-methylpiperazine having a B.P. of 124–125° C./6 mm. Hg. The product was dissolved in 6 ml. of ethanol and ethanol solution of a calculated amount of hydrogen chloride gas and ether were added to the solution. A formed precipitate was collected by filtration to give 4.5 g. of 1-(n-butyl)-2-phenyl-4-methylpiperazine hydrochloride and it was recrystallized from ethanol-ether mixture, to provide an M.P. of 235–237° C. (decomp.).

Analysis.—Calcd. for $C_{15}H_{26}N_2Cl_2 \cdot \frac{1}{2}H_2O$ (percent): C, 57.32; H, 8.66; N, 8.91. Found (percent): C, 57.58; H, 8.95, N, 9.04.

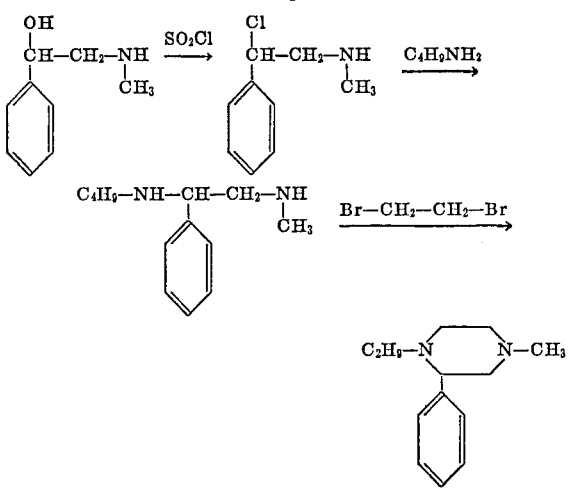

EXAMPLE 3

Preparation of 1-(p-methylphenyl)-2-phenyl-4-methyl-piperazine

Three grams of 1 chloro - 1 - phenyl-2-(n-methyl-2-chloroethylamino)-ethane obtained in the same manner as in Example 1(a) was dissolved in 8 ml. of ethanol and 4.2 g. of p-toluidine was added slowly with stirring under cooling with ice, and then the mixture was heated under reflux for 30 minutes. The reaction mixture was treated in the same manner as in Example 1(b) to give 2.5 g. of 1-(p-methylphenyl)-2-phenyl-4-methylpiperazine having a B.P. of 152–153° C./1 mm. Hg. Recrystallized from petroleum benzine M.P. 85–87° C.

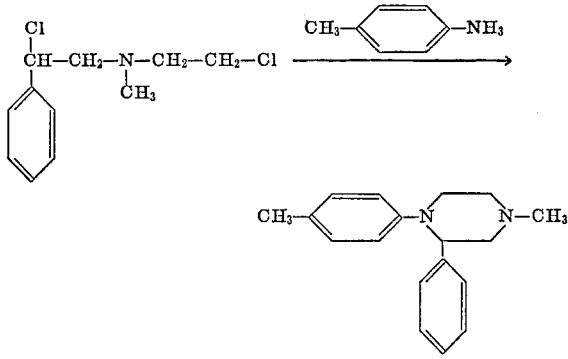

*Analysis.*—Calcd. for $C_{18}H_{22}N_2$ (percent): C, 81.16; H, 8.33; N, 10.52. Found (percent): C, 81.04; H, 8.24; N, 10.56.

EXAMPLE 4

Preparation of 1-(2-methoxy-5-tolyl)-2-phenyl-4-methylpiperazine (a) Forty-one grams of alpha-(N-methyl-2-hydroxyethylaminomethyl)-benzylalcohol obtained in the same manner as in Example 1(a) was dissolved in 220 ml. of methanol and hydrogen chloride gas was introduced into the solution, and then the solvent was removed by distillation under reduced pressure to give crude alpha-(N-methyl-2-hydroxyethylaminomethyl) - benzylalcohol hydrochloride. To the product was added 154 ml. of thionyl chloride to dissolve it and the solution was allowed to stand for a day. Excess thionyl chloride was removed by distillation under reduced pressure. The residue was poured onto 200 g. of cracked ice and the mixture was made strongly alkaline with 50%-caustic soda solution. A deposited oily substance was extracted with benzene and the extract was washed with water. Removal of benzene by distillation gave 32 g. of crude 1-chloro-1-phenyl-2-(N-methyl-2-chloroethylamino)-ethane. The product was distilled under reduced pressure to give 27 g. of pure 1-chloro-1-phenyl-2-(N-methyl - 2 - chloroethylamino)-ethane. B.P. 118–122° C./1 mm. Hg. Five grams of the product was dissolved in 6 ml. of ethanol and ethanol solution of a calculated amount of hydrogen chloride was added to the solution. A formed precipitate was collected by filtration to give 5.2 g. of 1-chloro-1-phenyl-2-(N-methyl-2-chloroethylamino)-ethane hydrochloride. Recrystallized from ethanol. M.P. 125–127° C.

*Analysis.*—Calcd. for $C_{11}H_{16}NCl_3$ (percent): C, 49.18; H, 6.00; N, 5.21. Found (percent): C, 48.95; H, 6.03; N, 5.35.

(b) To 20 ml. of ethanol was added 9.8 g. of crude 1-chloro - 1 - phenyl-2-(N-methyl-2-chloroethylamino)-ethane obtained in (a) and 20 ml. of ethanol solution of 17.3 g. of cresidine was dropped into the solution with stirring under cooling with ice in the course of 40 minutes and then the mixture was heated under reflux for 30 minutes. The reaction mixture was treated in the same manner as in Example 1(b) to give 8.2 g. of 1-(2-methoxy-5-tolyl)-2 - phenyl - 4 - methylpiperazine. B.P. 166–167° C./1 mm. Hg. Recrystallized from petroleum benzine. M.P. 102–104° C.

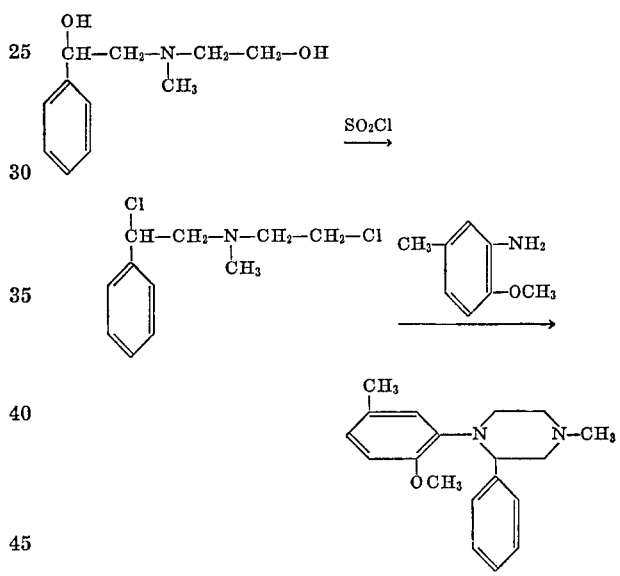

*Analysis.*—Calcd. for $C_{19}H_{24}ON_2$ (percent): C, 76.99; H, 8.16; N, 9.45. Found (percent): C, 77.00; H, 8.03; N, 9.61.

EXAMPLE 5

Preparation of 1-(2-methoxy-5-tolyl)-2-phenyl-4-methylpiperazine

Seven grams of 1-chloro - 1 - phenyl - 2 - methylaminoethane hydrochloride obtained in the same manner as in Example 2 was suspended in 70 ml. of ethanol and 20 ml. of ethanol solution of 4.6 g. of cresidine was dropped into the suspension with stirring in the course of 15 minutes, and then the mixture was heated under reflux for 2 hours. After cooling, 3.6 g. of anhydrous sodium carbonate was added to the mixture and it was heated under reflux for an additional 3 hours. After the hot reaction mixture was filtered to remove insoluble inorganic substances, the solvent was removed by distillation and 10% caustic soda solution was added to the residue to make it strongly alkaline. A deposited oily substance was extracted with benzene and the extract was washed with water and benzene was removed by distillation. Unreacted raw material cresidine was removed by distillation to give 8 g. of crude 1-(2-methoxyl-5-methylanilino)-1-phenyl-2-methylaminoethane. The product was heated under reflux in 60 ml. of toluene for 6 hours with 5.6 g. of 1,2-dibromoethane and 8.2 g. of anhydrous potassium carbonate. After cooling, the reaction mixture was filtered to remove insoluble inorganic substances and the solvent was removed by distillation. The residue was condensed under reduced pressure to give 5.9 g. of 1-(2-methoxy-5-tolyl)-2-phenyl-4 - methylpiperazine. B.P. 166–167° C./1 mm. Hg. The product was allowed to stand at room temperature to give crystals. Recrystallized from petroleum benzine. M.P. 102–104° C.

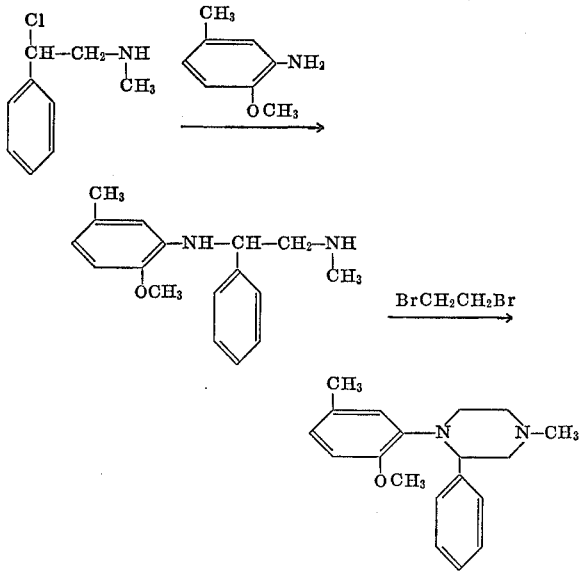

*Analysis.*—Calcd. for $C_{19}H_{24}ON_2$ (percent): C, 76.99; H, 8.16; N, 9.45. Found (percent): C, 76.78; H, 8.33; N, 9.50.

EXAMPLE 6

Preparation of 1-(p-chlorobenzyl)-2-phenyl-4-methylpiperazine

Six grams of 1-chloro-1-phenyl-2-(N-methyl-2-chloroethylamino)-ethane obtained in the same manner as in Example 1(a) was dissolved in 12 ml. of ethanol and 11 g. of p-chlorobenzylamine was added little by little to the solution with stirring under cooling with ice, and then the mixture was heated under reflux for 30 minutes.

The reaction mixture was treated in the same manner as in Example 1(b) to give 5.4 g. of 1-(p-chlorobenzyl)-2-phenyl-4-methylpiperazine. B.P. 179–181° C./1 mm. Hg. Recrystallized from petroleum benzine. M.P. 82–83° C.

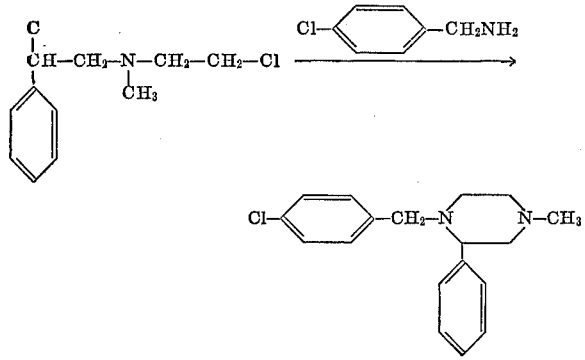

*Analysis.*—Calcd. for $C_{18}H_{21}N_2Cl$ (percent): C, 71.86; H, 7.04; N, 9.31. Found (percent): C, 71.77; H, 6.96; N, 9.42.

EXAMPLE 7

Preparation of 1-(p-chlorobenzyl)-2-phenyl-4-methylpiperazine (a) Into a suspension of 8.3 g. of 1-chloro-1-phenyl-2-methylaminoethane hydrochloride obtained in the same manner as in Example 2, in 90 ml. of ethanol, was added over 15 minutes 11.3 g. of p-chlorobenzylamine with stirring and the mixture was heated under reflux for 5 hours. After the reaction, the solvent was removed by distillation and an oily substance deposited by the addition of 10%-sodium carbonate solution was extracted with benzene. The extract was washed with water and benzene was removed by distillation. Unreacted raw material p-chlorobenzylamine was removed by distillation to give 9.2 g. of crude 1-(p - chlorobenzylamino) - 1 - phenyl-2-methylaminoethane. The product was distilled under reduced pressure to give 8.2 g. of pure 1-(p-chlorobenzylamino)-1-phenyl-2-methylaminoethane. B.P. 145–148° C./1 mm. Hg. Five grams of this product was dissolved in 6 ml. of ethanol and ethanol solution of a calculated amount of hydrogen chloride was added to the solution. A formed precipitate was collected by filtration to give 5.2 g. of 1-(p-chlorobenzylamino)-1-phenyl - 2 - methylaminoethane hydrochloride. Recrystallized from ethanol. M.P. 221–223° C. (decomp.).

*Analysis.*—Calcd. for $C_{16}H_{21}N_2Cl_3$ (percent): C, 55.26; H, 6.09; N, 8.06. Found (percent): C, 55.34; H, 5.89; N, 7.97.

(b) A mixture of 5.5 g. of crude 1-(p-chlorobenzylamino)-1-phenyl-2-methylaminoethane obtained in (a), 3.75 g. of 1,2-dibromoethane and 3.3 g. of anhydrous sodium acetate was heated with stirring at 120° C. for 4 hours. After cooling, water was added to the reaction mixture and it was made strongly alkaline with 10%-caustic soda solution.

A deposited oily substance was extracted with benzene and the extract was washed with water and benzene was removed by distillation. Distillation under reduced pressure gave 4.0 g. of 1-(p-chlorobenzyl)-2-phenyl-4-methylpiperazine. B.P. 179–181° C./1 mm. Hg. The product was allowed to stand at room temperature to give crystals. Recrystallized from petroleum benzine. M.P. 82–83° C.

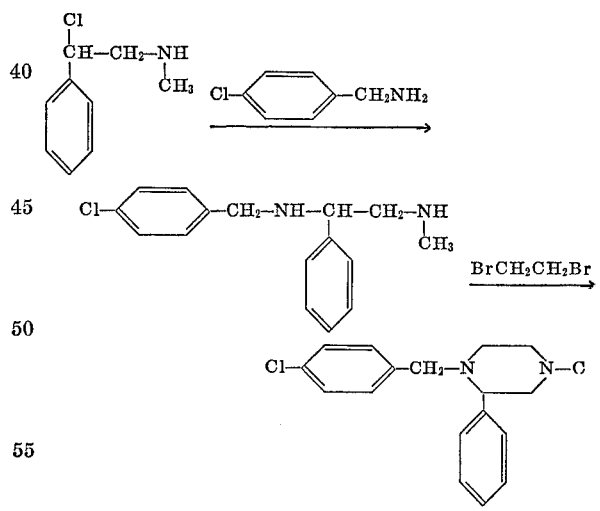

*Analysis.*—Calcd. for $C_{18}H_{21}N_2Cl$ (percent): C, 71.86; H, 7.04; N, 9.31. Found (percent): C, 72.01; H, 6.99; N, 9.57.

EXAMPLE 8

Preparation of 1-(p-methylbenzyl)-2-phenyl-4-methylpiperazine

Three grams of 1 - chloro - 1 - phenyl - 2 - (N-methyl-2-chloroethylamino)-ethane obtained in the same manner as in Example 1(a) was dissolved in 6 ml. of ethanol and 4.7 g. of p-methylbenzylamine was added little by little with stirring under cooling with ice, and then the mixture was heated under reflux for 30 minutes. The reaction mixture was treated in the same manner as in Example 1(b) to give 2.5 g. of 1-(p-methylbenzyl)-2-phenyl-4-methylpiperazine. B.P. 143–144° C./1.5 mm.

Hg. Recrystallized from petroleum benzine. M.P. 64–65° C.

*Analysis.*—Calcd. for $C_9H_{24}N_2$ (percent): C, 81.38; H, 8.63; N, 9.99. Found (percent): C, 81.27; H, 8.54; N, 10.06.

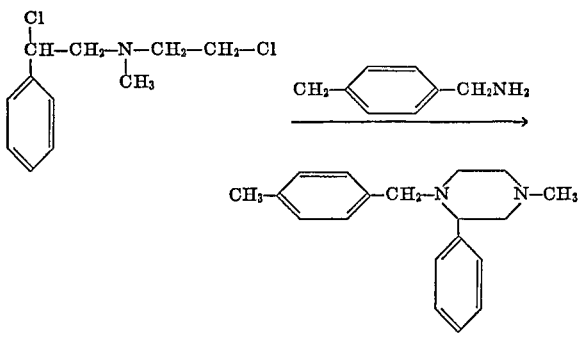

EXAMPLE 9

Preparation of 1-(p-methylbenzyl)-2-phenyl-4-methylpiperazine

Thirty-nine grams of alpha-(N-methyl-2-hydroxyethyl aminomethyl)-benzylalcohol obtained in the same manner as in Example 1(a) was dissolved in 80 ml. of ethanol and hydrogen bromide was introduced into the solution under cooling with ice. The solvent was removed by distillation under reduced pressure to give crude alpha-(N-methyl - 2 - hydroxyethylaminomethyl)-benzylalcohol hydrobromide. The product was suspended in 300 ml. of chloroform and 190 g. of phosphorus tribromide was added little by little to the solution with stirring under cooling with ice, and then the mixture was heated under reflux for 4 hours. The reaction mixture was poured onto 200 g. of cracked ice and it was made strongly alkaline with 50% caustic soda solution. A deposited oily substance was extracted with benzene and the extract was washed with water. Removal of benzene by distillation gave 35 g. of crude 1-bromo-1-phenyl-2-(N-methyl-2-bromoethylamino)-ethane. The product was dissolved in 70 ml. of ethanol and 39.5 g. of p-methylbenzylamine was dropped into the solution under cooling with ice in the course of 30 minutes, and then the mixture was heated under reflux for 30 minutes. The reaction mixture was treated in the same manner as in Example 1(b) to give 19 g. of 1-(p-methylbenzyl)-2-phenyl-4-methylpiperazine. B.P. 143–144° C./1.5 mm. Hg. Recrystallized from petroleum benzine. M.P. 64–65° C.

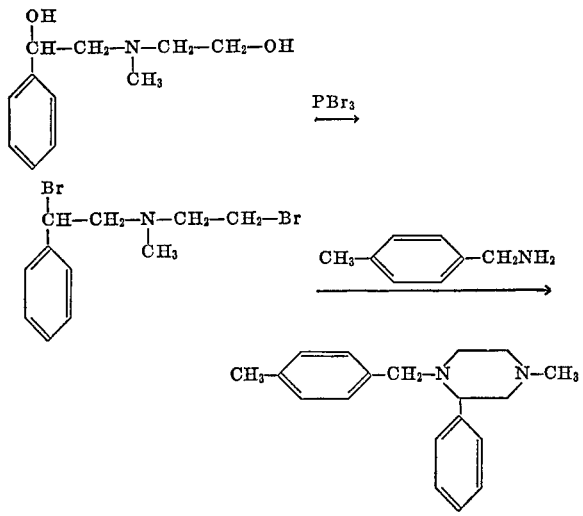

*Analysis.*—Calcd. for $C_{19}H_{24}N_2$ (percent): C, 81.38; H, 8.63; N, 9.99. Found (percent): C, 81.15; H, 8.71; N, 10.04.

EXAMPLE 10

Preparation of 1-(p-methylphenyl)-2-phenyl-4-ethylpiperazine (a) A mixture of 48 g. of 1-phenyl-1-hydroxy-2-ethylaminoethane, 28 g. of ethylenechlorhydrin and 23.7 g. of anhydrous potassium carbonate was heated under reflux in 160 ml. of 95%-ethanol for 12 hours. Then, insoluble inorganic substances were removed by filtration and the solvent was removed by distillation and the residue was dehydrated by azeotropic distillation with 20 ml. of benzene.

After two repetitions of this procedure, the residue was distilled under reduced pressure to give 45 g. of alpha-(N-ethyl - 2 - hydroxyethylaminomethyl)-benzylalcohol, B.P. 140–144° C./1 mm. Hg. The product was dissolved in 220 ml. of methanol and hydrogen chloride gas was introduced under cooling with ice. Then, the solvent was removed by distillation to give crude alpha-(N-ethyl-2-hydroxyethylaminomethyl)-benzylalcohol hydrochloride. To the product was added 224 ml. of thionyl chloride and it was dissolved at room temperature, and then the mixture was heated at 50° C. for 50 minutes. Excess thionyl chloride was removed by distillation under reduced pressure. The residue was poured onto 200 g. of cracked ice and the mixture was made strongly alkaline with 50%-caustic soda solution. A deposited oily substance was extracted with benzene and the extract was washed with water. Removal of benzene by distillation gave 35 g. of crude 1-chloro-1-phenyl-2-(N-ethyl-2-chloroethylamino)-ethane. This product was distilled under reduced pressure to give 28 g. of pure 1-chloro-1-phenyl-2-(N-ethyl-2-chloroethylamino)-ethane. Five grams of the pure product were dissolved in 10 ml. of ethanol and ethanol solution saturated with picric acid was added to the solution. A formed precipitate was collected by filtration to give 7 g. of 1-chloro-1-phenyl-2-(N-ethyl-2-chloroethylamino)-ethane picrate. Recrystallized from ethanol. M.P. 203–204° C. (decomp.).

*Analysis.*—Calcd. for $C_{18}H_{20}O_7N_4Cd_2$ (percent): C, 45.59; H, 4.24; N, 11.79. Found (percent): C, 45.36; H, 4.26; N, 11.83.

(b) Three grams of 1-chloro-1-phenyl-2-(N-ethyl-2-chloroethylamino)-ethane obtained in (a) was dissolved in 6 ml. of ethanol and 3.9 g. of toluidine was added slowly to the solution with stirring while cooling with ice, and then the mixture was heated under reflux for 30 minutes. The reaction mixture was treated in the same manner as in Example 1(b) to give 2.8 g. of 1-(p-methylphenyl)-2-phenyl-4-ethylpiperazine. B.P. 137–140° C./1 mm. Hg. The product was dissolved in 7 ml. of ethanol and an ethanol solution of a calculated amount of hydrogen chloride was added to the solution. A formed precipitate was collected by filtration to give 3.3 g. of 1-(p-methylphenyl)-2-phenyl-4-ethylpiperazine hydrochloride. Recrystallized from ethanol. M.P. 192–194° C. (decomp.)

*Analysis.*—Calcd. for $C_{19}H_{24}N_2Cl \cdot \tfrac{1}{2}H_2O$ (percent): C, 70.24; H, 7.76; N, 8.62. Found (percent): C, 70.21; H, 7.94; N, 8.78.

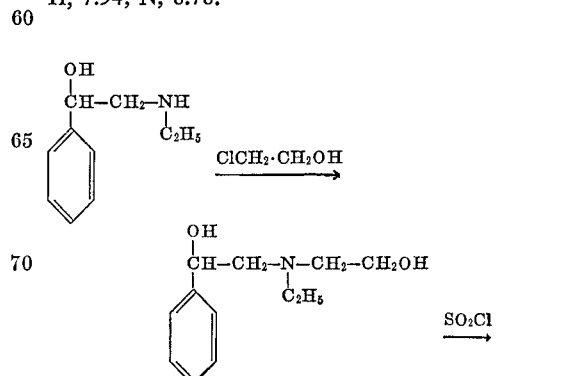

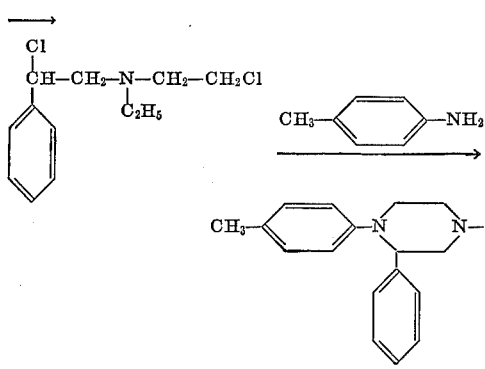

EXAMPLE 11

Preparation of 1-(p-methylphenyl)-2-phenyl-4-ethylpiperazine

To a suspension of 10.4 g. of 1-hydroxy-1-phenyl-2-ethylaminoethane hydrochloride in 90 ml. of chloroform was added little by little 18 g. of phosphorus pentachloride at a temperature of −10 to 5° C. in the course of 2 hours. The mixture was stirred for 4 hours and allowed to stand overnight. After removal of the solvent, cracked ice was added to the residue and the mixture was made strongly alkaline by carefully adding 50% caustic soda solution; the residue was then extracted with benzene. After washing the extract with water, removal of benzene by distillation gave 9 g. of crude 1-chloro-1-phenyl-2-ethylaminoethane. The product was dissolved in ethanol and hydrogen chloride gas was introduced into the solution under cooling with ice. The solvent was removed by distillation to give 10 g. of crude 1-chloro-1-phenyl-2-ethylaminoethane hydrochloride. The product was suspended in 80 ml. of ethanol and 7.7 g. of p-toluidine was dropped into the suspension with stirring under cooling with ice in the course of 15 minutes, and then the mixture was heated under reflux for 5 hours. After the reaction, the solvent was removed by distillation and 10% sodium carbonate solution was added to the residue. A deposited oily substance was extracted with benzene and the extract was washed with water and benzene was removed by distillation. Then, unreacted raw material p-toluidine was removed by distillation to give 7.4 g. of crude 1 - (p - toluidino) - 1 - phenyl - 2 - ethylaminoethane. The product was distilled under reduced pressure to give 6.7 g. of pure 1-(p-toluidino)-1-phenyl-2-ethylaminoethane. B.P. 112–115° C./1 mm. Hg. To a solution of 0.7 g. of the pure product in 6 ml. of ethanol was added ethanol solution of a calculated amount of hydrogen chloride and a deposited precipitate was collected by filtration to give 0.7 g. of 1-(p-toluidino)-1-phenyl - 2 - ethylaminoethane hydrochloride. Recrystallized from ethanol. M.P. 190–193° C. (decomp.)

*Analysis.*—Calcd. for $C_{17}H_{24}N_2Cl_2$ (percent): C, 62.38; H, 7.39; N, 8.56. Found (percent): C, 62.61; H, 7.44; N, 8.67.

(b) A mixture of 6 g. of crude 1-(p-toluidino)-1-phenyl-2-ethylaminoethane obtained in paragraph (a), 4.4 g. of 1.2-dibromoethane and 3.9 g. of anhydrous sodium acetate was heated with stirring at 120° C. for 4 hours. After cooling, water was added to the reaction mixture and it was made strongly alkaline with 10%-caustic soda solution. A deposited oily substance was extracted with benzene and the extract was washed with water and benzene was removed. The residue was distilled under reduced pressure to give 5.3 g. of 1-(p-methylphenyl)-2-phenyl-4-ethylpiperazine. B.P. 137–140° C./1 mm. Hg. The product was dissolved in 7 ml. of ethanol and ethanol solution of a calculated amount of hydrogen chloride was added to the solution. A deposited precipitate was collected by filtration to give 4.5 g. of 1-(p-methylphenyl)-2-phenyl-4-ethylpiperazine hydrochloride. M.P. 192–194° C. (decomp.)

*Analysis.*—Calcd. for $C_{19}H_{24}N_2Cl \cdot \frac{1}{2}H_2O$ (percent): C, 70.24; H, 7.76; N, 8.62. Found (percent): C, 70.42; H, 7.84; N, 8.50.

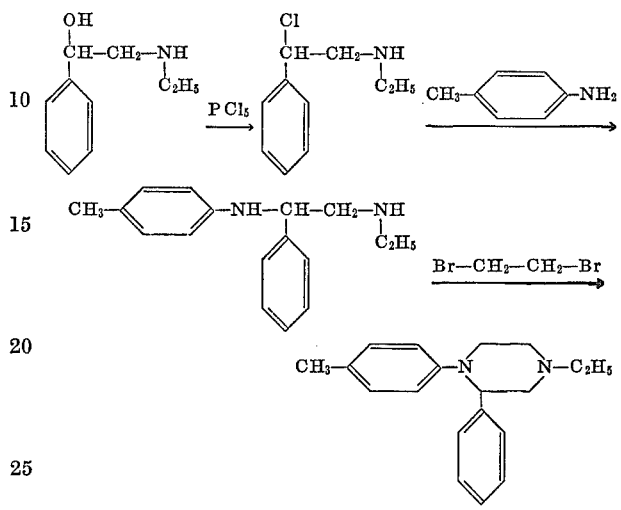

EXAMPLE 12

Preparation of 1-(p-chlorobenzyl)-2-phenyl-4-ethylpiperazine

Three grams of 1-chloro-1-phenyl-2-(N-ethyl-2-chloroethylamino)-ethane obtained in the same manner as in Example 10(a) was dissolved in 6 ml. of isopropanol and 5.2 g. of p-chlorobenzylamine was added little by little to the solution with stirring under cooling with ice, and then the mixture was heated under reflux for 30 minutes. The reaction mixture was treated in the same manner as in Example 1(b) to give 2.5 g. of 1-(p-chlorobenzyl)-2-phenyl-4-ethylpiperazine. B.P. 157–160° C./1 mm. Hg.

The product was dissolved in 5 ml. of ethanol and an ethanol solution of a calculated amount of hydrogen chloride was added to the solution. A formed precipitate was collected by filtration to give 2.7 g. of 1-(p-chlorobenzyl)-2-phenyl-4-ethylpiperazine hydrochloride. Recrystallized from ethanol. M.P. 233–235° C.

*Analysis.*—Calcd. for $C_{19}H_{23}N_2Cl_2 \cdot \frac{1}{2}H_2O$ (percent): C, 63.51; H, 6.73; N, 7.80. Found (percent): C, 63.42; H, 6.39; N, 7.98.

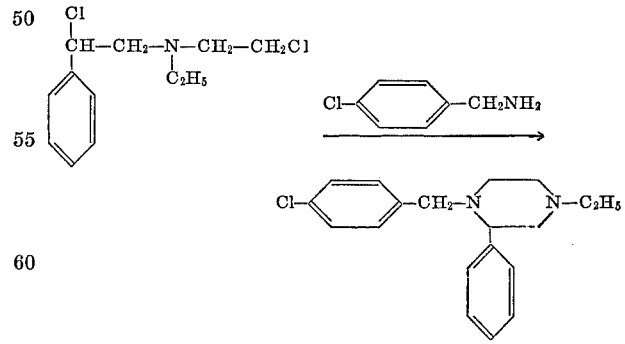

EXAMPLE 13

Prepartion of 1-(p-methylbenzyl)-2-phenyl-4-ethylpiperazine

Three grams of 1-chloro-1-phenyl-2-(N-ethyl-2-chloroethylamino)-ethane and 2.5 g. of triethyl amine was dissolved in 6 ml. of ethanol and 1.5 g. of p-methylbenzylamine was added little by little to the solution with stirring under cooling with ice, and then the mixture was heated under reflux for 30 minutes. The reaction mixture was treated in the same manner as in Example 1(b) to give 2.3 g. of 1-(p-methylbenzyl)-2-phenyl-4-ethylpiperazine. B.P.

132–135° C./1 mm. Hg. The product was dissolved in 5 ml. of ethanol and ethanol solution of a calculated amount of hydrogen chloride was added to the solution. A formed precipitation was collected by filtration to give 3.1 g. of 1-(p-methylbenzyl)-2-phenyl-4-ethylpiperazine hydrochloride. Recrystallized from ethanol. M.P. 183–185° C. (decomp.).

*Analysis.*—Calcd. for $C_{20}H_{26}N_2Cl \cdot H_2O$ (percent): C, 69.04; H, 8.11; N, 8.05. Found (percent): C, 69.19; H, 8.19; N, 8.18.

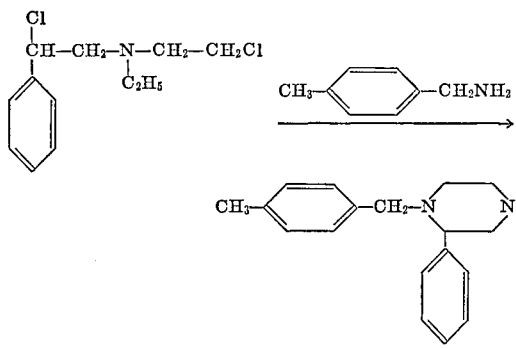

EXAMPLE 14

Preparation of 1-(p-chlorobenzyl)-2-phenyl-4-benzylpiperazine (a) Forty grams of 1-hydroxy-1-phenyl-2-benzylaminoethane was dissolved in 35 ml. of methanol by heating and 9.3 g. of ethylene oxide was introduced to the solution at room temperature in the course of 3 hours, and then the mixture was heated under reflux for an hour. The solvent was removed by distillation to give 38.5 g. of crude alpha-(N-benzyl-2-hydroxyethylaminomethyl) - benzylalcohol. The product was distilled under reduced pressure to give 31.8 g. of pure alpha-(N-benzyl-2 - hydroxyethylaminomethyl)-benzylalcohol. B.P. 191–193° C./1 mm. Hg. Five grams of the pure product was dissolved in 20 ml. of ethanol and ethanol solution of a calculated amount of hydrogen chloride was added to the solution. A formed precipitate was collected by filtration to give 5.2 g. of alpha-(N-benzyl-2 - hydroxyethylaminomethyl) - benzylalcohol hydrochloride. Recrystallized from ethanol. M.P. 147–149° C.

*Analysis.*—Calcd. for $C_{17}H_{22}O_2NCl$ (percent): C, 66.33; H, 7.20; N, 4.55. Found (percent): C, 66.67; H, 7.14; N, 4.66.

(b) Sixteen grams of crude alpha-(N-benzyl-2-hydroxyethylaminomethyl)-benzylalcohol obtained in paragraph (a) was dissolved in 50 ml. of methanol and hydrogen chloride gas was introduced into the solution. A formed precipitate was collected by filtration to give 16 g. of crude alpha-(N-benzyl-2 - hydroxyethylaminomethyl) - benzylalcohol hydrochloride. To this hydrochloride was added 65 ml. of thionyl chloride and the mixture was heated at 50° C. for 40 minutes. Excess thionyl chloride was removed by distillation under reduced pressure and 100 g. of cracked ice was added to the residue and the mixture was made strongly alkaline by adding 50%-caustic soda solution slowly at low temperature. A deposited oily substance was extracted with benzene and the extract was washed with water. Removal of benzene by distillation gave 13 g. of crude 1-chloro-1-phenyl-2-(N-benzyl-2 - chloroethylamino)-ethane. The crude product was distilled under reduced pressure to give 10.5 g. of pure 1-chloro-1-phenyl-2-(N-benzyl-2-chloroethylamino)-ethane. B.P. 163–166° C./1 mm. Hg. The product was dissolved in 13 ml. of ethanol and ethanol solution saturated with picric acid was added to the solution. A formed precipitate was collected by filtration to give 18 g. of 1-chloro-1-phenyl-2-(N-benzyl-2-chloroethylamino)-ethane picrate. Recrystallized from ethanol. M.P. 195–198° C. (decomp.)

*Analysis.*—Calcd. for $C_{23}H_{22}O_7N_4Cl_2$ (percent): C, 51.41; H, 4.13; N, 10.43. Found (percent): C, 51.35; H, 4.28; N, 10.56.

(c) Two grams of 1-chloro-1-phenyl-2-(N-benzyl-2-chloroethylamino)-ethane obtained in paragraph (b) was dissolved in 6 ml. of ethanol and 2.75 g. of p-chlorobenzylamine was added little by little with stirring under cooling with ice, and then the mixture was heated under reflux for 30 minutes. The solvent was removed by distillation and a small volume of water was added to the residue. The mixture was made strongly alkaline with 10% caustic soda solution and a deposited oily substance was extracted with benzene. After the extract was washed with water, benzene was removed by distillation and the residue was recrystallized from petroleum benzine to give 1.6 g. of 1-(p-chlorobenzyl)-2-phenyl - 4 - benzylpiperazine, M.P. 102–103° C.

*Analysis.*—Calcd. for $C_{24}H_{25}N_2Cl$ (percent): C, 76.47; H, 6.69; N, 7.43. Found (percent): C, 76.57; H, 6.59; N, 7.49.

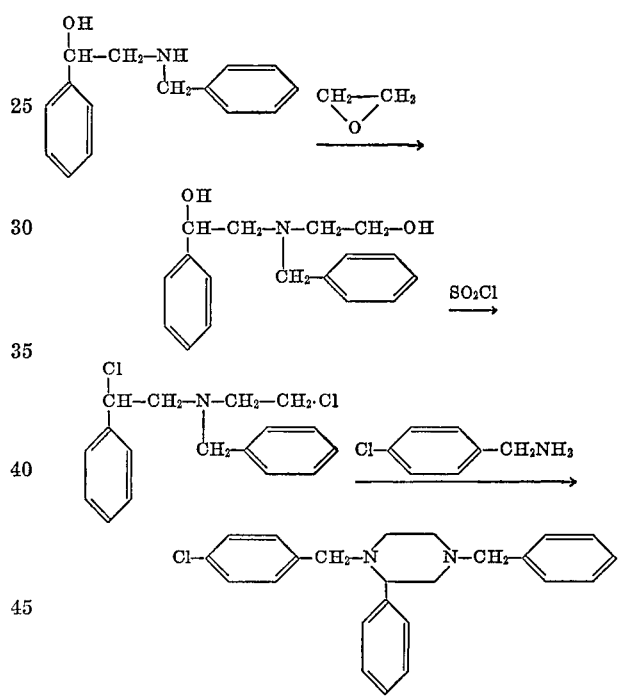

EXAMPLE 15

Preparation of 1-(p-chlorobenzyl)-2-phenyl-4-benzylpiperazine (a) Into a suspension of 7.5 g. of 1-hydroxy-1-phenyl-2-benzylaminoethane in 60 ml. of chloroform was added over the course of an hour 15 g. of phosphorous tribromide while cooling with ice, and then the mixture was heated under reflux for 4 hours. The reaction mixture was poured into water and excess phosphorus tribromide was decomposed with 40%-caustic soda solution while cooling with ice. The pH was adjusted at 7 and the chloroform layer was separated and washed with water. After drying with mirabilite, the chloroform was removed by distillation to give 7 g. of crude 1-bromo-1-phenyl-2-benzylaminoethane. The crude product was dissolved in 10 ml. of ethanol and hydrogen bromide gas was introduced into the solution. The solvent was removed by distillation to give 8.7 g. of crude 1-bromo-1-phenyl-2-benzylaminoethane hydrobromide. The hydrobromide product was dissolved in 100 ml. of ethanol and 5.7 g. of p-chlorobenzylamine was dropped into the solution with stirring in the course of 15 minutes, and then the mixture was heated under reflux for 5 hours. After the reaction, the solvent was removed by distillation and 10%-sodium carbonate solution was added to the residue. A deposited oily substance was extracted with benzene and the extract was washed with water and benzene was removed by distillation. Unreacted raw material p-chlorobenzylamine was removed by distillation to give 5.1 g. of crude 1-(p-chlorobenzylamino)-1-phenyl-2-benzylaminoethane. One gram of the product was dissolved in 2 ml. of ethanol and an ethanol solution of a calculated amount of hydrogen chloride was added to the solution. A formed precipitate was collected by filtration to give 0.9 g. of 1-(p-chlorobenzylamino)-1-phenyl-2-benzylaminoethane hydrochloride. Recrystallized from ethanol. M.P. 272–274° C. (decomp.).

*Analysis.*—Calcd. for $C_{22}H_{25}N_2Cl_3$ (percent): C, 62.34; H, 5.95; N, 6.61. Found (percent): C, 62.51; H, 6.04; N, 6.79.

(b) A mixture of 3.4 g. of 1-(p-chlorobenzylamino)-1-phenyl-2-benzylaminoethane obtained in paragraph (a), 1.8 g. of 1,2-dibromoethane and 1.6 g. of anhydrous sodium acetate was heated with stirring at 120° C. for 4 hours. To the reaction mixture was added 10%-caustic soda solution and the mixture was extracted with benzene. The extract was washed with water and benzene was removed by distillation. The residue was recrystallized from petroleum benzine to give 2.6 g. of 1-(p-chlorobenzyl)-2-phenyl-4-benzylpiperazine. M.P. 102–103° C.

*Analysis.*—Calcd. for $C_{24}H_{25}N_2Cl$ (percent): C, 76.47; H, 6.69; N, 7.43. Found (percent): C, 76.71; H, 6.43; N, 7.44.

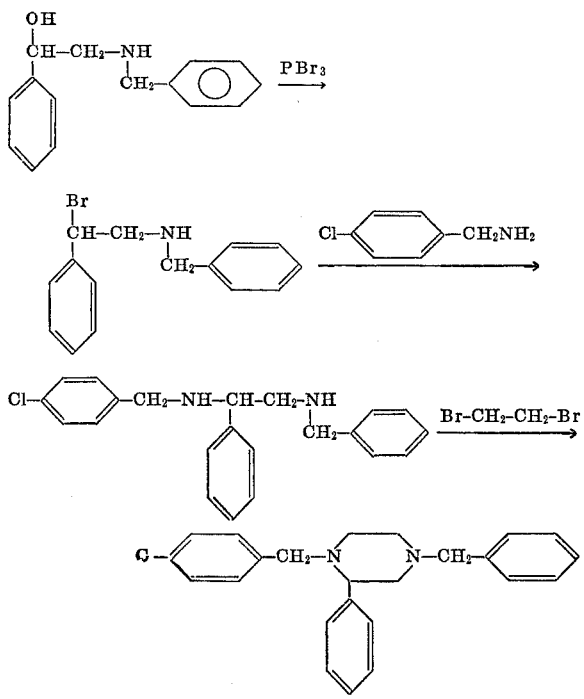

EXAMPLE 16

Preparation of 1-(p-methylbenzyl)-2-phenyl-4-benzylpiperazine

Two grams of 1-chloro-1-phenyl-2-(N-benzyl-2-chloroethylamino)-ethane obtained in the same manner as in Example 14(b) was dissolved in 6 ml. of ethanol and 2.4 g. of p-methoxybenzylamine was added little by little to the solution with stirring under cooling with ice, and then the mixture was heated under reflux for 30 minutes. The reaction mixture was treated in the same manner as in Example 14(c) to give 2.1 g. of 1-(p-methylbenzyl)-2-phenyl-4-benzylpiperazine. Recrystallized from petroleum benzine: M.P. 104–106° C.

*Analysis.*—Calcd. for $C_{25}H_{28}N_2$ (percent): C, 84.22; H, 7.93; N, 7.86. Found (percent): C, 84.19; H, 8.05; N, 7.89.

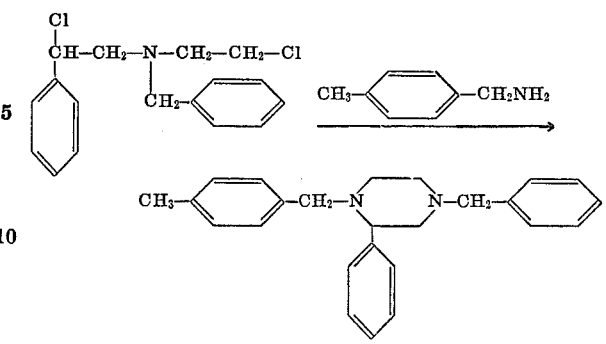

EXAMPLE 17

Preparation of 1-(p-methylbenzyl)-2-phenyl-4-benzylpiperazine

To 11.5 g. of 1-hydroxy-1-phenyl-2-benzylaminoethane hydrochloride was added 60 ml. of thionyl chloride and the mixture was heated at 50° C. for 50 minutes. Excess thionyl chloride was removed by distillation under reduced pressure to give 10 g. of crude 1-chloro-1-phenyl-2-benzylaminoethane hydrochloride. The product was suspended in 12 ml. of ethanol and 8.5 g. of p-methylbenzylamine was dropped into the solution with stirring in the course of 15 minutes, and then the mixture was heated under reflux for 5 hours. After the reaction, the solvent was removed by distillation and 10%-sodium carbonate solution was added to the residue. A deposited oily substance was extracted with benzene and the extract was washed with water and benzene was removed by distillation. Unreacted raw material p-methylbenzylamine was removed by distillation to give 7.9 g. of crude 1-(p-methylbenzylamino)-phenyl-2-benzylaminoethane. To the product were added 3.8 g. of 1,2-dibromoethane and 3.4 g. of anhydrous sodium acetate and the mixture was heated with stirring at 120° C. for 4 hours. After the reaction, 10%-caustic soda solution was added to the reaction mixture and the mixture was extracted with benzene. After the extract was washed with water, benzene was removed by distillation and the residue was recrystallized from petroleum benzene to give 4.9 g. of 1-(p-methylbenzyl)-2-phenyl - 4 - benzylpiperazine. M.P. 104–106° C.

*Analysis.*—Calcd. for $C_{25}H_{28}N_2$ (percent): C, 84.22; H, 7.93; N, 7.86. Found (percent): C, 84.09; H, 8.12; N, 8.01.

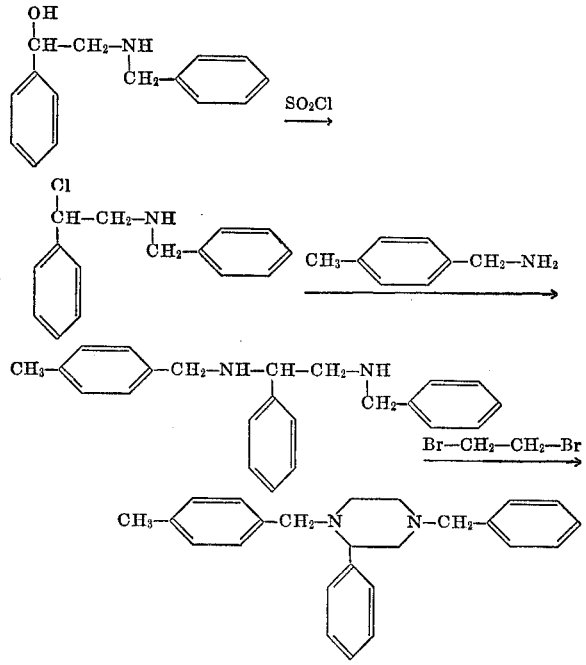

EXAMPLE 18

Preparation of 1-(2-methoxy-5-tolyl)-2-phenyl-3,4-dimethylpiperazine (a) Into a solution of 85.5 g. of dl-ephedrine dissolved in 65 ml. of methanol was introduced 30.8 g. of ethylene oxide at room temperature in the course of 2 hours and the mixture was heated under reflux for an hour. The solvent was removed by distillation and the residue was distilled under reduced pressure to give 74.5 g. of N-(2-hydroxyethyl) - dl - ephedrine. B.P. 136–139° C./1 mm. Hg. Five grams of this product was dissolved in 10 ml. of ethanol and an ethanol solution of a calculated amount of hydrogen chloride was introduced into the solution. A formed precipitate was collected by filtration to give 5.1 g. of N-(2-hydroxyethyl)-dl-ephedrine hydrochloride. Recrystallized from ethanol: M.P. 134–135° C.

Analysis. — Calcd. for $C_{12}H_{20}O_2NCl$ (percent): C, 58.65; H, 8.20; N, 5.70. Found (percent): C, 58.73; H, 8.22; N, 5.59.

(b) Fifty-seven grams of crude N-(2-hydroxyethyl)-dl-ephedrine obtained in (a) was dissolved in 200 ml. of methanol and hydrogen chloride gas was introduced into the solution. A formed precipitate was collected by filtration to give 60 g. of crude N-(2-hydroxyethyl)-dl-ephedrine hydrochloride. To the product was added 180 ml. of thionyl chloride and the mixture was heated at 50° C. for 40 minutes. Excess thionylchloride was removed by distillation under reduced pressure and 250 g. of cracked ice was added to the residue. The mixture thus obtained was made strongly alkaline by adding 50%-caustic soda solution little by little at a low temperature, and a deposited oily substance was extracted with benzene. After the extract was washed with water, benzene was removed by distillation to give 41.5 g. of crude 1-chloro-1-phenyl - 2 - (N-methyl - 2-chloroethylamino)-propane. The product was distilled under reduced pressure to give 6.3 g. of pure 1 - chloro - 1 - phenyl-2-(N-methyl-2-chloroethylamino)-propane. B.P. 135–137° C./1 mm. Hg. Two grams of the pure product was dissolved in 2 ml. of ethanol and ethanol solution of a calculated amount of hydrogen chloride was introduced into the solution. A formed precipitate was collected by filtration to give 1.9 g. of 1 - chloro - 1 - phenyl-2-(N-methyl-2-chloroethylamino)-propane hydrochloride. Recrystallized from ethanol. M.P. 150–151° C.

Analysis.—Calcd. for $C_{12}H_{18}NCl_3$ (percent): C, 50.99; H, 6.42; N, 4.96. Found (percent): C, 51.03; H, 6.50; N, 5.00.

(c) Into a solution of 3.5 g. of 1-chloro-1-phenyl-2-(N-methyl-2-chloroethylamino)-propane dissolved in 9 ml. of ethanol was dropped 8 ml. of ethanol solution containing 5.7 g. of cresidine with stirring under cooling with ice, and the mixture was heated under reflux for 30 minutes. The reaction mixture was treated in the same manner as in Example 1(b) to give 2.1 g. of 1-(2-methoxy - 5 - tolyl) - 2 - phenyl-3,4-dimethylpiperazine. B.P. 145–147° C/1.5 mm. Hg. One gram of the product was dissolved in 1 ml. of ethanol and an ethanol solution saturated with picric acid was added to the solution, and then a formed precipitate was collected by filtration to give 1.2 g. of 1 - (2 - methoxy - 5 - tolyl)-2-phenyl-3,4-dimethylpiperazine picrate. Recrystallized from ethanol. M.P. 207–208° C. (decomp.)

Analysis.—Calcd. for $C_{32}H_{32}O_{15}N_8$ (percent): C, 50.00; H, 4.20; N, 14.58. Found (percent): C, 49.61; H, 4.22; N, 14.60.

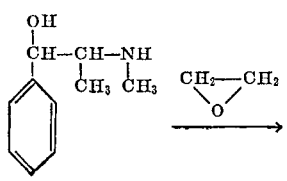

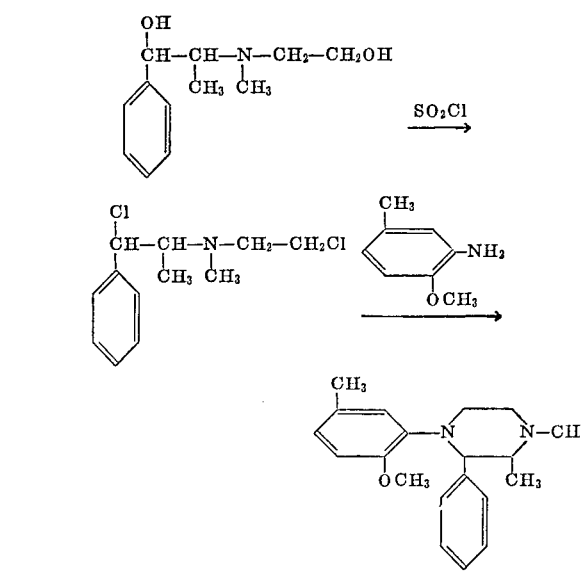

EXAMPLE 19

Preparation of (+)-1-(p-chlorobenzyl)-2-phenyl-3,4-dimethylpiperazine (a) To a mixture of 12 g. of phosphorus pentachloride dissolved in 30 ml. of chloroform was added 7.7 g. of l-ephedrine hydrochloride with stirring under cooling with ice in the course of an hour. The mixture was heated slowly and kept at 65° C. for 2 hours, and then filtered. The crystals thus obtained were recrystallized from ethanol to give 5.5 g. of L(+)-threo-1-chloro-1-phenyl-2-methylaminopropane hydrochloride. M.P. 202–203° C. $[\alpha]_D^{23} + 119.54°$ (c.=3.6, ethanol).

Analysis.—Calcd. for $C_{11}H_{15}NCl_2$ (percent): C, 54.56; H, 6.87; N, 6.36. Found (percent): C, 54.48; H, 6.91; N, 6.50.

(b) Into a suspension of 5.5 g. of L(+)-threo-1-chloro-1-phenyl-2-methylaminopropane hydrochloride obtained in paragraph (a) in 60 ml. of ethanol was dropped 7.1 g. of p-chloro-benzylamine with stirring in the course of 15 minutes and the mixture was heated under reflux for 5 hours. After the reaction, the solvent was removed by distillation and 10%-sodium carbonate solution was added to the residue. A deposited oily substance was extracted with benzene and the extract was washed with water and benzene was removed by distillation. Unreacted raw material p-chlorobenzylamine was removed by distillation to give 6.5 g. of crude (+)-1-(p-chlorobenzylamino)-1-phenyl-2-methylaminopropane. The crude product was distilled under reduced pressure to give 5.7 g. of pure (+) - 1-(p-chlorobenzylamino)-1-phenyl-2-methylaminopropane. B.P. 155–157° C./0.5 mm. Hg. The product was dissolved in 5 ml. of ethanol and an ethanol solution of a calculated amount of hydrogen chloride was added to the solution. Further to the solution was added ether and a formed precipitate was collected by filtration to give 5.8 g. of (+)-1-(p-chlorobenzylamino)-1-phenyl-2-methylaminopropane hydrochloride. Recrystallized from ethanol: M.P. 240–241° C. $[\alpha]_D^{23} + 11.9°$ (c.=3.0, water).

Analysis.—Calcd. for $C_{17}H_{23}N_2Cl_3$ (percent): C, 56.44; H, 6.40; N, 7.74. Found (percent): C, 56.34; H, 6.30; N, 7.98.

Alternatively, into a suspension of 9.5 g. of L(+)-threo-1-chloro-1-phenyl - 2 - methylaminopropane hydrochloride obtained in (a) in 100 ml. of ethanol was dropped 6.1 g. of p-chlorobenzylamine with stirring in the course of 15 minutes and the mixture was heated under reflux for 2 hours. After cooling, 4.6 g. of anhydrous sodium carbonate was added to the mixture and it was heated under reflux further for 3 hours. After the hot reaction mixture was filtered to remove insoluble inorganic substances, the solvent was removed by distillation and 10%-sodium carbonate solution was added to make is strongly alkaline. A deposited oily substance was extracted with benzene and the extract was washed with water and benzene was removed by distillation. Unreacted raw material p-chlorobenzylamine was removed by distillation to give 8.9 of (+)-1-(p-chlorobenzylamino)-1-phenyl-2-methylaminopropane.

(c) A mixture of 4.2 g. of (+)-1-(p-chlorobenzylamino)-1-phenyl-2-methylaminopropane, 2.75 g. of 1,2-dibromoethane and 2.4 g. of anhydrous sodium acetate was heated with stirring at 120° C. for 4 hours. After cooling, water was added to the reaction mixture and it was made strongly alkaline with 10%-caustic soda solution. A deposited oily substance was extracted with benzene and the extract was washed with water and benzene was removed by distillation. The residue was distilled under reduced pressure to give 3.5 g. of (+) - 1 - (p-chlorobenzyl)-2-phenyl-3,4-dimethylpiperazine. B.P. 160–162° C./0.5 mm. Hg. Recrystallized from petroleum benzine: M.P. 90–92° C. $[\alpha]_D^{23} + 12.2°$ (c.=4.5, ethanol).

*Analysis.*—Calcd. for $C_{19}H_{23}N_2Cl$ (percent): C, 72.48; H, 7.36; N, 8.90. Found (percent): C, 72.24; H, 7.26; N, 8.99.

Alternativelyy, into a solution of 4 g. of (+)-1-(p-chlorobenzylamino)-1-phenyl-2 - methylaminopropane hydrochloride and 1.9 g. of potassium hydroxide dissolved in 26 ml. of ethanol was dropped 2.4 g. of 1,2-dibromoethane with stirring under heating in the course of an hour and the mixture was heated under reflux for 8 hours. The reaction mixture was filtered to remove insoluble inorganic substances and the solvent was removed by distillation. The residue was treated in the same manner as above to give 3.1 g. of (+)-1-(p-chlorobenzyl)-2-phenyl-3,4-dimethylpiperazine.

Alternatively, 6.2 g. of (+)-1-(p-chlorobenzylamino)-1-phenyl-2-methylaminopropane, 4.1 g. of 1,2-dibromoethane and 6 g. of anhydrous potassium carbonate were suspended in 40 ml. of toluene and the mixture was heated under reflux for 6 hours. After cooling, insoluble inorganic substances were removed by filtration and the solvent was removed by distillation. The residue was distilled under reduced pressure to give 4.5 g. of (+)-1-(p-chlorobenzyl)-2-phenyl-3,4-dimethylpiperazine.

was heated at 50° C. for 40 minutes. Excess thionyl chloride was removed by distillation under reduced pressure to give 8.8 g. of crude 1-chloro-1-phenyl-2-methylaminopropane hydrochloride. The hydrochloride was suspended in 73 ml. of ethanol and 8.5 of p-chlorobenzylamine was dropped into the suspension under reflux in the course of 15 minutes and the mixture was heated under reflux for 5 hours. After the reaction, the solvent was removed by distillation and an oily substance deposited by the addition of 10%-sodium carbonate solution was extracted with benzene. The extract was washed with water and benzene was removed by distillation. Unreacted raw material p-chlorobenzylamine was removed by distillation to give 6.8 g. of crude 1 - (p-chlorobenzylamino)-1-phenyl-2-methylaminopropane. The crude product was distilled under reduced pressure to give 6.1 g. of pure 1-(p-chlorobenzylamino)-1-phenyl-2 - methylaminopropane. B.P. 159–162° C./0.5 mm. Hg. The pure product was dissolved in 6 ml. of ethanol and an ethanol solution of a calculated amount of hydrogen chloride was added to the solution, followed by adding ether. A formed precipitate was collected by filtration to give 6.2 g. of 1-(p-chlorobenzylamino)-1-phenyl-2 - methylaminopropane hydrochloride. Recrystallized from ethanol: M.P. 235–237° C. (decomp.).

*Analysis.*—Calcd. for $C_{17}H_{23}N_2Cl_3$ (percent): C, 56.44; H, 6.40; N, 7.74. Found (percent): C, 56.29; H, 6.41; N, 7.80.

(b) A mixture of 9 g. of 1-(p-chlorobenzyl)-1-phenyl-2-methylaminopropane obtained in paragraph (a), 6 g. of 1,2-dibromoethene and 5.9 g. of anhydrous sodium acetate was heated with stirring at 120° C. for 4 hours. After cooling, water was added to the reaction mixture and 10%-caustic soda solution was added to make it strongly alkaline. A deposited oily substance was extracted with benzene and the extract was washed and benzene was removed by distillation. The residue was distilled under reduced pressure to give 6.9 g. of 1-(p-chlorobenzyl)-2-phenyl-3,4-dimethylpiperazine. B.P. 163–164° C./1.5 mm. Hg. The product was allowed to stand to give crystals. Recrystallized from petroleum benzine: M.P. 86–87° C.

*Analysis.*—Calcd. for $C_{19}H_{23}N_2Cl$ (percent): C, 72.48; H, 7.36; N, 8.90. Found (percent): C, 72.62; H, 7.44; N, 8.98.

EXAMPLE 20

Preparation of 1-(p-chlorobenzyl)-2-phenyl-3,4-dimethylpiperazine (a) To 8.6 g. of dl-ephedrine hydrochloride was added little by little 40 ml. of thionyl chloride, and the mixture

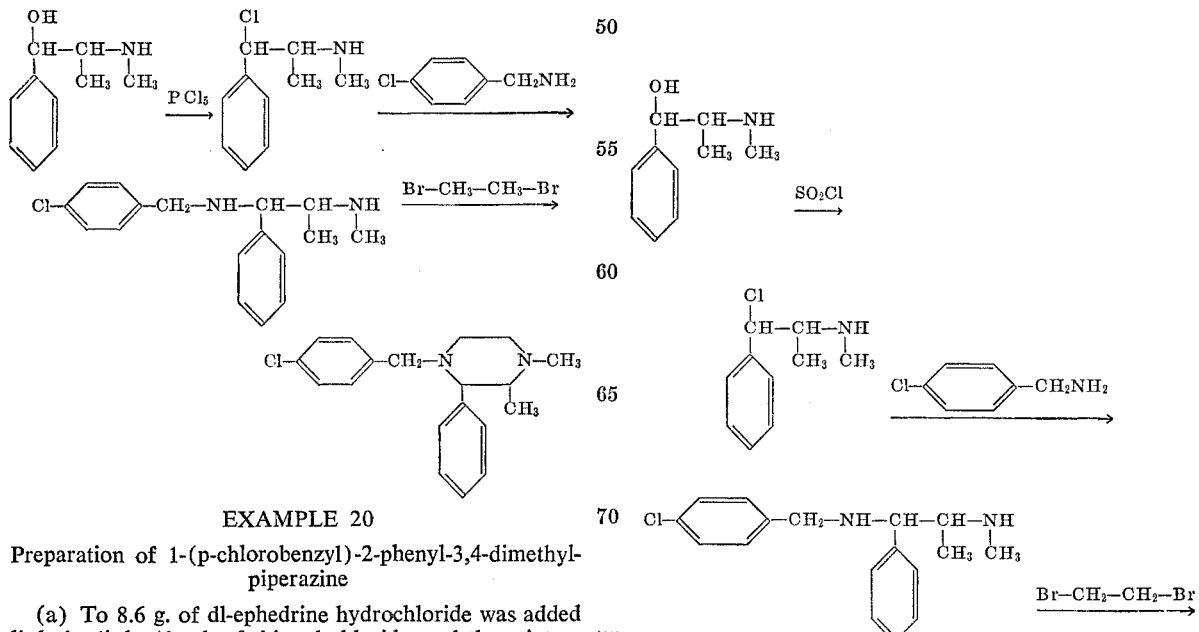

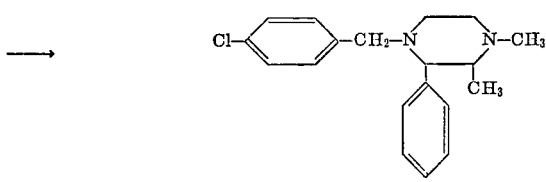

EXAMPLE 21

Preparation of 1-(p-methylbenzyl)-2-phenyl-3,4-dimethylpiperazine

To a solution of 3.5 g. of 1-chloro-1-phenyl-2-(N-methyl-2-chloroethylamino)-propane obtained in the same manner as in Example 1(b) dissolved in 10 ml. of ethanol was added little by little 5.3 g. of p-methylbenzylamine with stirring under cooling with ice, and the mixture was heated under reflux for 30 minutes. The reaction mixture was treated in the same manner as in Example 1(b) to give 2.1 g. of 1-(p-methylbenzyl)-2-phenyl-3,4-dimethylpiperazine. B.P. 132–136° C./1 mm. Hg. Recrystallized from petroleum benzine: M.P. 92–93° C.

*Analysis.*—Calcd. for $C_{20}H_{26}N_2$ (percent): C, 81.58; H, 8.90; N, 9.52. Found (percent): C, 81.69; H, 8.83; N, 9.52.

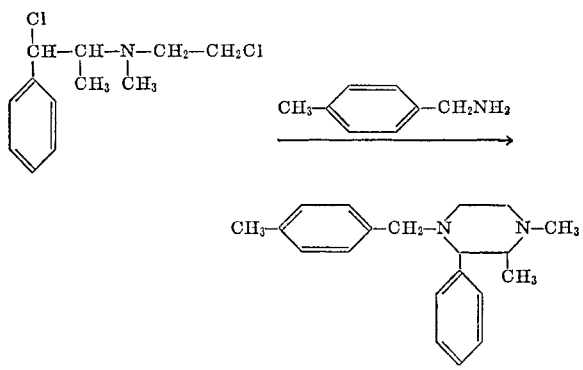

Effects of 2-phenylpiperazine derivatives on coronary blood flow in dogs

The effect of 2-phenylpiperazine derivatives on coronary blood flow was tested by the left coronary cannulation method in dogs. Apparently, healthy dogs of both sexes, weighing 11–18 kg., were used and anaesthetized with 50 mg./kg. of sodium amobarbiturate administered intraveneously. Coronary inflow was recorded kymographically via the bubble flowmeter on an extracorporeal circuit of the blood from the right femoral artery to the left coronary artery through a coronary cannula inserted in the right carotid.

The dose of the test compound was in all instances 1 mg./head (in the form of dihydrochloride) in 1 ml. physiological saline which was injected in 30 seconds via a vinyl tube inserted in the coronary artery.

Each compound was tested in 3 dogs. The effects of these compounds on coronary blood flow are shown in the following table (the effect of each compound was determined by the mean value of the three). Aminophylline was administered in the same manner as the 2-phenylpiperazine derivatives. The minimum effective daily dosage for dogs was found to be 0.005 mg./kg. when injected via intra-artery.

| No. | $R_1$ | $R_2$ | $R_3$ | Effect on coronary blood flow |
|---|---|---|---|---|
| 1 | $C_4H_9$— | $CH_3$— | H | + |
| 2 | $CH_3$—C6H4— | $CH_3$— | H | ++ |
| 3 | $CH_3$, $OCH_3$—C6H3— | $CH_3$— | H | +++ |
| 4 | Cl—C6H4—CH2— | $CH_3$— | H | +++ |
| 5 | $CH_3$—C6H4—CH2— | $CH_3$— | H | +++ |
| 6 | $CH_3$—C6H4— | $C_2H_5$— | H | ++ |
| 7 | Cl—C6H4—CH2— | $C_2H_5$— | H | +++ |
| 8 | $CH_3$—C6H4—CH2— | $C_2H_5$— | H | +++ |
| 9 | $CH_3$—C6H4—CH2— | C6H5—CH2— | H | +++ |
| 10 | $CH_3$, $OCH_3$—C6H3— | $CH_3$— | $CH_3$ | ++ |
| 11 | Cl—C6H4—CH2— | $CH_3$— | $CH_3$ | ++++ |
| 12 | $CH_3$—C6H4—CH2— | $CH_3$— | $CH_3$ | +++ |
| | Aminophylline | | | + |

NOTE: +=Effective as well as aminophylline; ++=More effective than aminophylline (about two times); +++=Apparently more effective than aminophylline (about three times); ++++=More than five times efficacy of aminophylline.

What we claim is:

1. A 1,4-disubstituted 2-phenyl piperazine selected from the group consisting of 1-(p-chlorobenzyl)-2-phenyl-3,4 - dimethyl piperazine; 1-(p-chlorobenzyl)-2-phenyl-4-methyl piperazine; and 1 - (p-chlorobenzyl)-2-phenyl-4-ethyl piperazine.

2. 1-(p-chlorobenzyl)-2-phenyl - 4 - methylpiperazine in accordance with claim 1.

3. 1-(p-chlorobenzyl)-2-phenyl-4-ethylpiperazine in accordance with claim 1.

4. 1 - (p - chlorobenzyl)-2-phenyl-3,4-dimethylpiperazine in accordance with claim 1.

(References on following page)

References Cited

UNITED STATES PATENTS

| | | | |
|---|---|---|---|
| 2,400,022 | 5/1946 | Pollard | 260—268 |
| 2,636,032 | 4/1953 | Weston et al. | 260—268 |
| 3,239,528 | 3/1966 | Bebenburg | 260—268 |
| 3,285,917 | 11/1966 | Brader | 260—268 |

OTHER REFERENCES

Roderick et al.: Jour. Med. Chem., vol. 9, pp. 181–185 (1966).

Platte: Dissertation Abstr., vol. 23, col. 3128 (1963).

Platte, H. J.: "The Synthesis of 2-phenyl Piperazine and Some Derivatives," Thesis, 1–51 (1962).

DONALD G. DAUS, Primary Examiner

U.S. Cl. X.R.

260—268 SY; 424—250

UNITED STATES PATENT OFFICE
CERTIFICATE OF CORRECTION

Patent No. 3,663,548          Dated May 16, 1972

Inventor(s) Yoshihiro NITTA et al.

It is certified that error appears in the above-identified patent and that said Letters Patent are hereby corrected as shown below:

Column 7, the formula at line 15, "$C_2H_9$" should read --$C_4H_9$--

Column 9, the formula at line 51, "$\overset{C}{\underset{CH}{|}}$" should read --$\overset{Cl}{\underset{CH}{|}}$--

Column 17, the formula at line 50, "C-" should read --Cl- --

Column 20, the formula at line 20, "N-CH" should read --N-$CH_3$--

Signed and sealed this 5th day of September 1972.

(SEAL)
Attest:

EDWARD M. FLETCHER, JR.  
Attesting Officer

ROBERT GOTTSCHALK  
Commissioner of Patents